Figure 1:
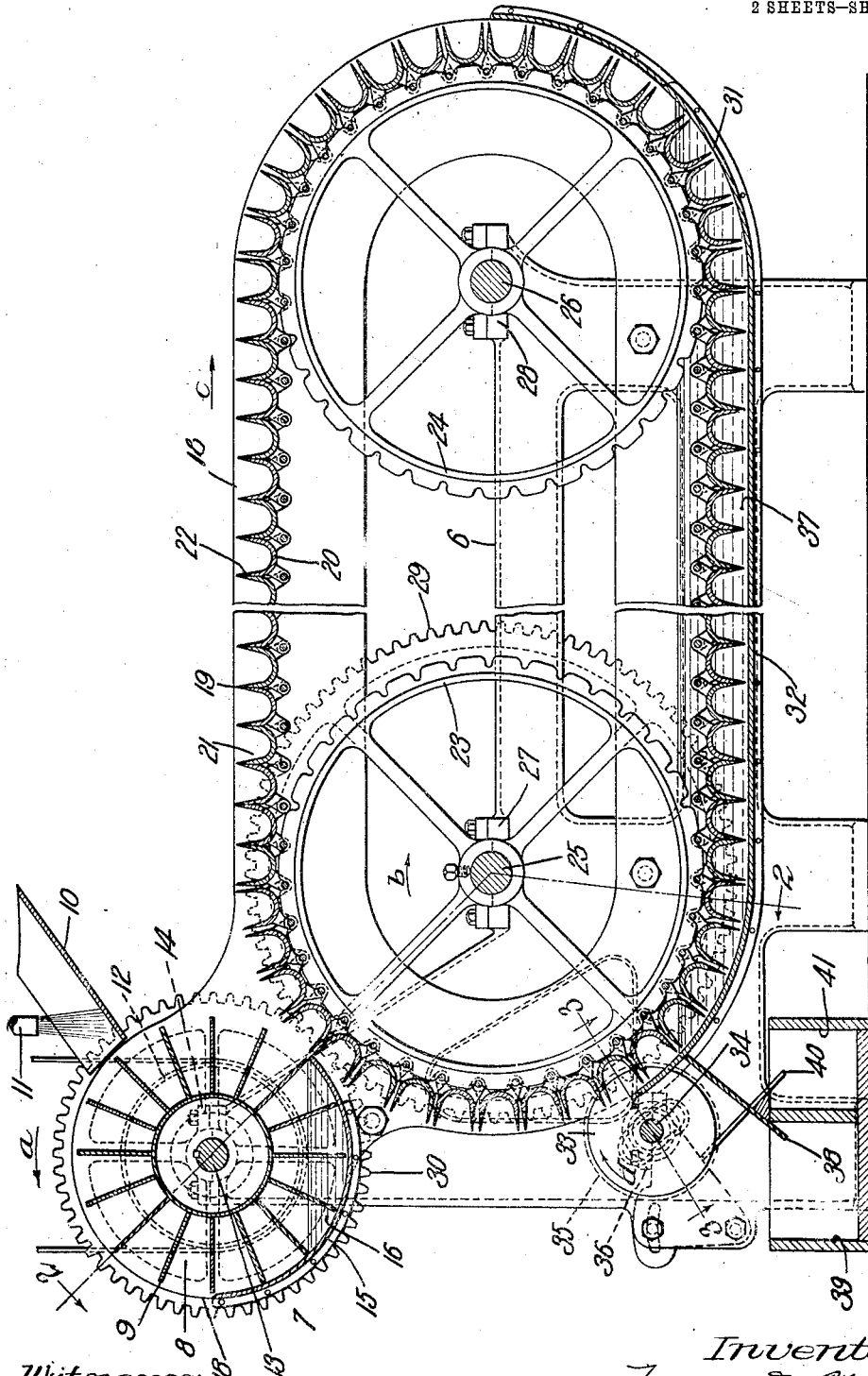

F. D. CLEVELAND.
MACHINE FOR POSITIONING AND CUTTING FISH.
APPLICATION FILED MAY 14, 1913.

1,125,656.

Patented Jan. 19, 19

2 SHEETS—SHEET 1

Witnesses:
Leonard A. Powell
Franklin E. Low

Inventor.
Francis D. Cleveland
by his attorney, Charles J. Gooding

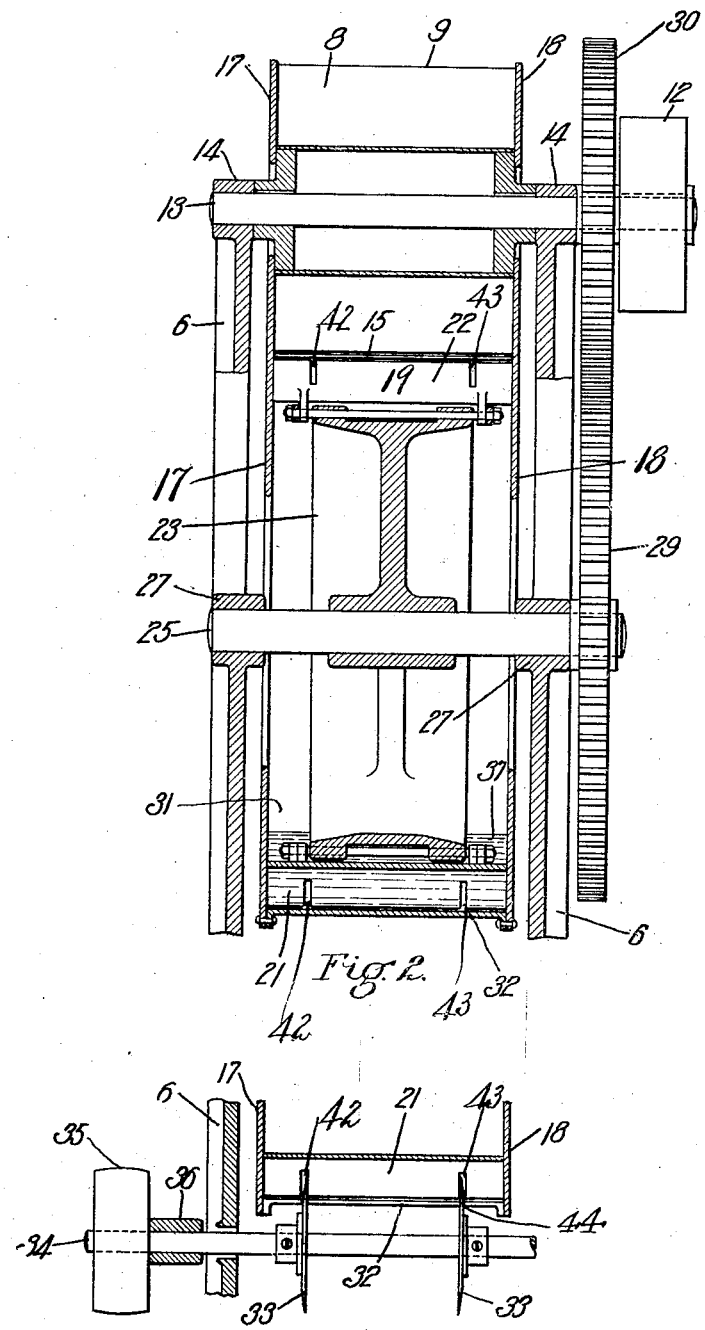

UNITED STATES PATENT OFFICE.

FRANCIS D. CLEVELAND, OF WINCHESTER, MASSACHUSETTS, ASSIGNOR TO WILLIAM UNDERWOOD COMPANY, OF BOSTON, MASSACHUSETTS, A CORPORATION OF MASSACHUSETTS.

MACHINE FOR POSITIONING AND CUTTING FISH.

1,125,656.

Specification of Letters Patent.

Patented Jan. 19, 1915.

Application filed May 14, 1913. Serial No. 767,642.

*To all whom it may concern:*

Be it known that I, FRANCIS D. CLEVELAND, a citizen of the United States, residing at Winchester, in the county of Middlesex and State of Massachusetts, have invented new and useful Improvements in Machines for Positioning and Cutting Fish, of which the following is a specification.

This invention relates to a machine for positioning fish and is particularly adapted to sever the heads and tails of said fish from the bodies after the fish have been positioned. In positioning the fish an endless chain conveyer is utilized, the fish being delivered to pockets in the periphery of said endless conveyer and carried through a tank of water. By this means the fish, as they are pushed through the water sidewise by the partitions between the pockets of the endless conveyer, will tend to move in the direction in which their heads are pointed and up against gages on opposite sides of said conveyer, so that by the time that the fish have been pushed through the tank of water by the conveyer they will be positioned with their heads up against the gages on opposite sides, respectively, of the conveyer, in readiness to have the heads and tails severed by suitable cutting means, preferably rotary cutters, located at the delivery end of said tank.

In addition to the chain conveyer it is sometimes preferable to have the fish delivered to the chain conveyer by a rotary conveyer which is also combined with a receptacle adapted to contain water, constituting a shield or tank, located at the under side of the rotary conveyer, whereby the fish are partly positioned before they are delivered to the conveyer.

The invention consists in the combination and arrangement of parts set forth in the following specification and particularly pointed out in the claims thereof.

Referring to the drawings: Figure 1 is a sectional elevation of a machine embodying my invention. Fig. 2 is a sectional elevation taken on line 2—2 of Fig. 1. Fig. 3 is a sectional elevation taken on line 3—3 of Fig. 1.

Like numerals refer to like parts throughout the several views of the drawings.

In the drawings, 6 is the frame of the machine, 7 is a rotary carrier with pockets 8 opening out of the periphery thereof and separated from each other by partitions 9, said pockets adapted to contain fish, the fish being fed into said pockets by an inclined chute 10 to which water is supplied by a pipe 11 to assist in floating the fish into said pockets. The fish and the water enter the pockets 8 and the carrier is rotated by a pulley 12 fast to a shaft 13, to which shaft the rotary carrier 7 is also fastened. The shaft 13 is journaled in suitable bearings 14 in the frame of the machine. The pockets 8 extend transversely of the rotary carrier 7 and of the direction of movement of said carrier. The carrier is adapted to be moved in the direction of the arrow $a$ (Fig. 1).

A shield 15, adapted to contain water, is located beneath the carrier 7 with its inner face adjacent to the periphery thereof. Said shield extends on opposite sides of a vertical plane containing the median axial line of the rotary carrier 7, so that the same is adapted to hold a body of water 16 therein. The pockets 8 are closed at their opposite ends by vertical flanges 17 and 18 to which the shield is fastened. These flanges constitute gages against which the heads of the fish rest when they become positioned in the pockets 8 or in the pockets of the endless conveyer hereinafter described.

An endless chain conveyer 19 is provided consisting of a series of links 20 and having pockets 21 opening out of its periphery, separated from each other by imperforate partitions 22. The endless chain conveyer is driven by sprockets 23 and 24 fast to shafts 25 and 26, respectively, which shafts are journaled to rotate in suitable bearings 27 and 28 in the frame of the machine. The shaft 25 is rotated in the direction of the arrow $b$ by a gear 29 fast to said shaft and meshing into a gear 30 fast to the shaft 13.

The endless chain conveyer 19 moves in the direction of the arrow $c$ and the pockets 21 extend transversely thereof and transversely of the direction of motion of said conveyer. The conveyer is arranged to move through a tank 31 having a bottom 32 curved at its opposite ends to extend partly around the sprockets 23 and 24, said bottom being fastened to the vertical flanges 17 and 18. These vertical flanges close the opposite ends of the pockets 21 and constitute gages, as hereinbefore described.

A pair of rotary cutters 33 are fastened to a shaft 34 and rotated in the direction of the arrow $d$ by a pulley 35 fast to the shaft 34. Said shaft 34 is journaled in suitable bearings 36 on the frame of the machine.

The fish are carried through a body of water 37 in the tank 31 and as they are pushed along by the partitions 22 of the endless conveyer they naturally move in the direction in which their heads may be pointed until said heads rest against the gages 17 or 18, as the case may be. The fish are pushed up the inclined portion of the bottom 32 of the tank adjacent to the cutters until the heads and tails are severed by said cutters, whereupon the bodies pass down a chute 38 into a receptacle 39, while the heads and tails pass down a chute 40 into a receptacle 41. The partitions 22 are provided with slots 42 and 43 and the bottom 32 of the tank 31 at the end thereof adjacent said cutters is provided with slots 44 into which slots 42, 43 and 44 the cutters 33 project during the cutting operation.

It will be noted that the periphery of the carrier is located adjacent to the periphery of the endless chain conveyer and preferably tangential thereto and that the shield 15 is so arranged that the fish may be delivered directly from the rotary carrier to the endless chain conveyer.

The general operation of the mechanism hereinbefore specifically described is as follows: Fish are fed to the machine through a chute 10 with their bodies extending longitudinally of said chute and water is supplied to said chute through a pipe 11 so that the fish and water pass down said chute and into the pockets 8 of the rotary carrier 7. As they pass into said pockets they turn and assume positions extending lengthwise of the pockets or in the direction of the median axial line of the carrier 7. Said rotary carrier 7 being rotated in the direction of the arrow $a$ carries the fish and water around into the shield 15 and the fish slide down the partitions 9 against the inner face of said shield, and as they are pushed through the body of water 16 in the bottom of the shield 15, the fish naturally move in the direction in which their heads are pointed and toward the gages 17 and 18. The fish are pushed by the partitions 9 out of the shield 15 and into the pockets 21 of the endless chain conveyer 19. This conveyer moves in the direction of the arrow $c$ and the fish are carried by it partly around the sprocket 24 and downwardly into the body of water 37 in the bottom 32 of the tank 31. As the fish are now pushed along through this body of water by the partitions of the endless chain conveyer, they will move in the direction in which their heads are pointed until their heads rest against the opposite flanges 17 and 18, respectively. The fish are then forced against the rotary cutters 33 by said partitions coöperating with the upwardly inclined end portion of the bottom 32 of said tank 31, the heads and tails being severed therefrom and passing down the chute 40 into the receptacle 41, while the bodies pass down the chute 38 into the receptacle 39.

Having thus described my invention, what I claim and desire by Letters Patent to secure is:

1. A machine for positioning fish having, in combination, a fish carrier consisting of an endless chain conveyer, means adapted to move said conveyer in a given direction, said conveyer having a series of pockets with sides formed by imperforate partitions extending transversely thereof and of the direction of movement of said conveyer, said pockets opening out of the periphery of said conveyer, and a fish positioning tank adapted to hold water through which said conveyer is adapted to pass, the inner face of the bottom of said tank being in close proximity to the periphery of said conveyer.

2. A machine for positioning fish having, in combination, a pair of sprocket wheels, an endless chain conveyer, movable in a given direction and engaging said sprockets, said conveyer having a series of pockets with sides formed by imperforate partitions extending transversely thereof and of the direction of movement of said conveyer, said pockets opening out of the periphery of said conveyer, and a fish positioning tank adapted to hold water through which said conveyer is adapted to pass, the inner face of the bottom of said tank being located beneath said conveyer and in close proximity to the periphery thereof.

3. A machine for positioning fish having, in combination, a pair of sprocket wheels, an endless chain conveyer, movable in a given direction and engaging said sprockets, said conveyer having a series of pockets with sides formed by imperforate partitions extending transversely thereof and of the direction of movement of said conveyer, said pockets opening out of the periphery of said conveyer, and a fish positioning tank adapted to hold water through which said conveyer is adapted to pass, the inner face of the bottom of said tank being located beneath said conveyer and in close proximity to the periphery thereof and extending upwardly at its opposite ends partly around said sprockets.

4. A machine for positioning fish having, in combination, a pair of sprocket wheels, an endless chain conveyer, movable in a given direction and engaging said sprockets, said conveyer having a series of pockets with sides formed by imperforate partitions extending transversely thereof and of the direction of movement of said conveyer, said pockets opening out of the periphery of said conveyer, a fish positioning tank adapted to hold water through which said conveyer is adapted to pass, the inner face of the bottom of said tank being located beneath said conveyer and in close proximity to the periphery thereof and extending upwardly at its opposite ends partly around said sprockets, and means to feed fish to said conveyer.

5. A machine for positioning fish having, in combination, a fish carrier consisting of an endless chain conveyer, means adapted to move said conveyer in a given direction, said conveyer having a series of pockets with sides formed by imperforate partitions extending transversely thereof and of the direction of movement of said conveyer, said pockets opening out of the periphery of said conveyer, a fish positioning tank adapted to hold water through which said conveyer is adapted to pass, the inner face of the bottom of said tank being in close proximity to the periphery of said conveyer, and means to feed fish into said pockets.

6. A machine for cutting fish having, in combination, a fish carrier consisting of an endless chain conveyer, means adapted to move said conveyer in a given direction, said conveyer having a series of pockets with sides formed by imperforate partitions extending transversely thereof and of the direction of movement of said conveyer, said pockets opening out of the periphery of said conveyer, a fish positioning tank adapted to hold water through which said conveyer is adapted to pass, the inner face of the bottom of said tank being in close proximity to the periphery of said conveyer, means to feed fish into said pockets, a cutter projecting into said pockets and into slots provided in said tank and in said conveyer and mechanism to move said cutter transversely of said pockets.

7. A machine for cutting fish having, in combination, a fish carrier consisting of an endless chain conveyer, means adapted to move said conveyer in a given direction, said conveyer having a series of pockets with sides formed by imperforate partitions extending transversely thereof and of the direction of movement of said conveyer, said pockets opening out of the periphery of said conveyer, a fish positioning tank adapted to hold water through which said conveyer is adapted to pass, the inner face of the bottom of said tank being in close proximity to the periphery of said conveyer, means to feed fish into said pockets, gages at opposite ends, respectively, of said pockets, a cutter projecting into said pockets and into slots provided in said tank and in said conveyer and mechanism to move said cutter transversely of said pockets.

In testimony whereof I have hereunto set my hand in presence of two subscribing witnesses.

FRANCIS D. CLEVELAND.

Witnesses:
  CHARLES S. GOODING,
  SYDNEY E. TAFT.